March 15, 1966 M. L. BRIER 3,239,954
SELF-CLEANING WHEEL FOR SELF-PROPELLED SNOW BLOWER
Filed May 8, 1963
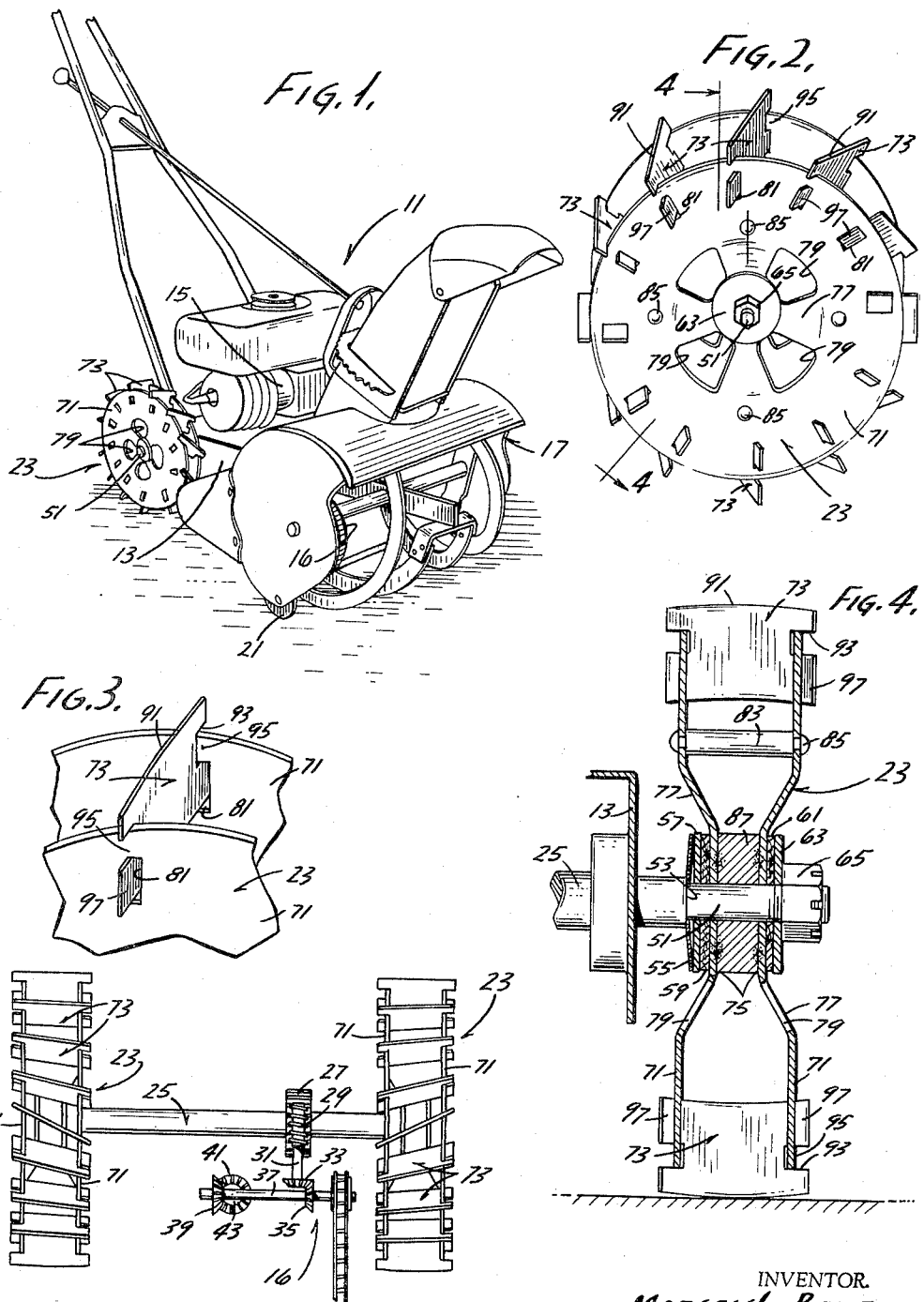
INVENTOR.
MARCEL L. BRIER
BY
Wheeler, Wheeler & Wheeler
ATTORNEYS.

United States Patent Office 3,239,954
Patented Mar. 15, 1966

3,239,954
SELF-CLEANING WHEEL FOR SELF-PROPELLED SNOW BLOWER
Marcel L. Brier, Peterborough, Ontario, Canada, assignor to Outboard Marine Corporation, Waukegan, Ill., a corporation of Delaware
Filed May 8, 1963, Ser. No. 278,843
9 Claims. (Cl. 37—43)

The invention relates generally to wheel structures. More particularly, the invention relates to traction wheels which are particularly adapted for use on snow and ice.

The invention provides a traction wheel which includes a series of loosely supported traction plates or blades extending generally radially with respect to the axis of wheel rotation and in generally spaced relation to each other in a circular series about the axis of wheel rotation. In one preferred embodiment, the traction plates are disposed at an angle to the axis of wheel rotation so that their outer edges provide, more or less, a continuously extending load supporting edge which serves to avoid up and down bumping during travel over a hard surface. The traction plates are supported in opposed rims which, inwardly of the traction plates, are provided with relatively large apertures so as to facilitate, in cooperation with the loose connection of the traction plates to the rims, discharge during wheel movement of any ice and snow accumulation within the opposed rims and between the traction plates, thereby obtaining maximum traction by avoiding clogging of the wheel with snow or ice.

The invention also provides, in connection with the traction wheels, a self-propelled snow-blowing vehicle. Other objects and advantages of the invention will become known by reference to the following description and accompanying drawings of one embodiment of the invention.

In the drawings:

FIGURE 1 is a perspective view of a self-propelled snow blowing vehicle including various of the features of the invention;

FIGURE 2 is an enlarged perspective view of one of the wheels mounted on the vehicle shown in FIGURE 1;

FIGURE 3 is an enlarged fragmentary perspective view of the connection between the traction blades and the wheel rims;

FIGURE 4 is a partially sectioned, elevational view, taken generally along line 4—4 of FIGURE 2, of one of the traction wheels and its mounting; and FIGURE 5 is a diagrammatic view of the power train from the engine to the traction wheels.

The snow blowing vehicle 11 shown in the drawings is representative of a wide range of self-propelled and manually propelled vehicles which can be constructed in accordance with the invention. The snow blowing vehicle 11 includes a frame 13 mounting a conventional engine 15, such as for example, a two-stroke internal combustion engine. Connected through a suitable speed reducing power train 16 (see FIGURES 1 and 5), and supported on the forward end of the frame 13, is a snow blowing device 17 of conventional construction. The snow blowing device 17 includes, on each side, a small supporting wheel 21.

Supported rearwardly on the frame 13 are a pair of generally identical traction wheels 23 especially adapted for use on snow and ice. The wheels are each mounted on a transverse drive shaft 25 which is journaled on the frame 13. The drive shaft 25 is rotated, in response to operation of the engine 13, by suitable means connected to the speed reducing power train 16.

In the disclosed construction, the drive shaft 25 carries a gear 27 which is driven by a worm 29 and carried on the rearward end of a fore and aft shaft 31 journaled on the frame 13. At its forward end, the shaft 31 carries a bevel gear 33 in mesh with a bevel gear 35 carried on a transverse shaft 37 forming a part of the power train 16 to the snow blowing device 17. In turn, the transverse shaft 37 is connected through bevel gears 39 and 41 to the crankshaft 43 of the engine 15.

Various means can be provided for mounting the traction wheels 23 on the drive shaft 25. In the disclosed construction, the mounting includes a slip-clutch arrangement. More specifically, at each end, the drive shaft 25 includes a portion 51 of reduced diameter which rotatably supports one of the traction wheels 21 and which includes a threaded outer end. Located in series between one side of each of the traction wheels and the adjacent shoulder 53 of the associated reduced diameter portion 51 is a dished spring washer 55, commonly referred to as a Belleville washer, a steel washer 57 engaged by the spring washer 55 and a fiber washer 59 sandwiched between the traction wheel 23 and the steel washer 57. On the other side of the traction wheel, there are assembled, in series, on the reduced diameter shaft portion 51, a second fabric washer 61 in engagement with the traction wheel 23, a steel washer 63 engaging the fiber washer 61, and a nut 65 which is threaded on the shaft portion 51 so as to snugly engage the spring washer 55 between the shoulder 53 and the adjacent steel washer 57, thereby obtaining releasable driving engagement between the associated traction wheel 23 and the drive shaft 25. A cotter pin is employed to prevent working loose of the nut 65.

Considering the construction of the traction wheels 23 in greater detail, each traction wheel includes a pair of rims 71 which are joined together in generally opposing parallel relation and which loosely support a series of traction plates or blades 73. The rims 71 are generally of identical construction, except for being right and left handed, each rim being generally circular in shape and including a central dished portion incorporating an annular recessed section 75 and an inclined transition section 77. The dished portions of the opposed rims 71 extend inwardly toward each other to minimize the volume within the traction wheels 23 in which snow or ice can accumulate. In order to accommodate discharge of any snow or ice accumulated between the rims, a series of relatively large apertures 79 are provided in the rims 71, preferably in the inclined transition section 77. Disposition of these apertures 79 in the inclined transition section 77 permits discharge, in response to a radially inward movement, of the snow or ice. Spaced evenly along the outer portion of the rims 71 and in evenly spaced relation to the rim periphery are a series of spaced, radially elongated rectangular slots 81. As will be seen hereinafter, the slots form one component of means for loosely securing the traction blades 73 to the rims 71.

Various means can be employed to join the rims 71 together. In the disclosed construction, the rims are joined together by riveted connections 83 with a series of cross rods or shafts 85 and by a central hub 87 joined, as by spot welding, between the central rim sections 75. The hub also provides means defining a bearing for engaging the reduced diameter portion 51 of the drive shaft 25.

The traction blades 73 are all generally identical, each blade comprising a flat, generally rectangular member having a width greater than the spacing between the opposed rims 71. The outer edge 91 of each of the blades is slightly curved so that when the blades are assembled with the rims 71, the outer edges 91 lie in an imaginary cylindrical surface having an axis coinciding with the axis of wheel rotation.

The blades 73 are preferably loosely connected to the rims 71 to afford limited relative movement therebetween, which movement facilitates dislodging of any snow or ice adhering to the blades and within the wheel. Various means can be utilized to loosely connect the blades to the rims. One preferred arrangement includes the beforementioned slots 81 in the wheel rims 71 and a notch or cutout 93 on each of the blade side edges in spaced relation to the outer edge 91. Such notches 93 serve to receive the peripheral portion 95 of the rim 71 between the outer edge of the slots 81 and rim periphery and to define ears or projections 97 having a length along the blade sides substantially equal to the radial length of the rim slots 81. The width of the rim slots 81 is considerably greater than the thickness of the blades 73 so that when the traction wheel is assembled, the ears 97 are loosely received in the rim slots 81 and the peripheral rim portions 95 are loosely disposed within the notches 93, thereby affording translatory movement of the blades in directions extending generally tangentially to the wheel.

In order to facilitate relative movement of the traction blades relative to the wheel rims, the blades are dimensioned and assembled to the rims so that the outer blades edges 91 extend beyond the peripheral edge of the rims. Consequently, the weight of the vehicle is supported on the edges 91. During travel, the resulting engagement of the blade edges 91 with the supporting ground or surface tends to effect movement of the blades relative to the rim so as to assist in dislodging any snow or ice accumulations.

In order to avoid up and down bumping of the snow blowing vehicle as it travels on the traction blades 73 over a relatively hard surface, the blades 73 are connected to the rims 71 at an angle to the axis of wheel rotation. In this regard, the slots 81 in the rims 71 are disposed so that the slots 81 receiving the ears 97 of any particular traction blade 73 are offset from each other by generally equal distances in opposite directions from a radial line passing through the center of the traction blade. Depending on the extent to which the slots 81 are offset from such radial lines, the blade edges 91 can provide a relatively continuous load bearing edge. In the disclosed construction, the load bearing edge provided by the outer edges 91 of the traction blades 73 extends, more or less continuously, in segmental parts, around the periphery of the wheels 23.

Various of the features of the invention are set forth in the following claims.

What is claimed is:

1. A wheel construction comprising a pair of rims, transverse means securing said rims to each other in generally opposed parallel relation, means on said rims providing a bearing having an axis about which said rims are intended to rotate, a series of traction blades each including flat projections, means on said rims defining a series of slots respectively receiving said flat projections, each slot having a width substantially greater than the associated one of said flat projections, whereby said blades are loosely secured transversely between said rims and in spaced relation to one another in a circular series around said axis for translatory movement relative to said rims, said traction blades each extending generally radially and including an outer edge terminating at least as far from said axis as the adjacent periphery of said rims.

2. A wheel in accordance with claim 1 wherein each of said rims is aperture inwardly of said traction blades.

3. A wheel in accordance with claim 1 wherein each of said rims includes a central part dished inwardly toward the opposed rim and apertures in said inwardly dished central part.

4. A wheel in accordance with claim 2 wherein each of said traction blades is flat and the plane of each of said traction blades is disposed at an angle with respect to said axis.

5. A wheel construction comprising a pair of rims, each of said rims including a central part dished inwardly toward the opposed rim and apertures in said inwardly dished central part, transverse means securing said rims to each other in generally parallel relation, means on said rims providing a transverse bearing having an axis about which said rims are intended to rotate, a series of flat traction blades, means loosely securing said traction blades transversely between said rims in generally radially extending relation to and at an angle with respect to said axis and in spaced relation to one another in a circular series around said axis, and with the outer edges thereof terminating at least as far from said axis as the adjacent periphery of said rims, said traction blade securing means including means in each rim and for each traction blade defining a slot disposed in spaced relation from the rim periphery, said slots having a width substantially greater than the thickness of said traction blades, and means on each side of each traction blade defining a cutout receiving the rim portion between the associated one of said slots and the rim periphery and defining a flat projection received in the associated one of said slots.

6. A vehicle comprising a frame, an engine mounted on said frame, a snow blowing device mounted on said frame, a power train drivingly connecting said snow blowing device and said engine, a drive shaft having at each end a portion of reduced diameter, means mounting said drive shaft for rotation on said frame, means drivingly connecting said drive shaft and said engine, a traction wheel carried on each of said reduced diameter drive shaft portions, said traction wheels comprising a pair of rims, transverse means securing said rims to each other in generally opposed parallel relation, a series of traction blades each including flat projections, means on said rims defining a series of slots respectively receiving said flat projections, each slot having a width substantially greater than the associated one of said flat projections whereby said blades are loosely secured transversely between said rims and in spaced relation to one another in a circular series around the axis of said drive shaft for translatory movement relative to said rims, said traction blades each extending generally radially and including an outer edge terminating at least as far from the axis of said drive shaft as the adjacent periphery of said rims, and slip clutch means rotatably connecting said traction wheels and said drive shaft.

7. A vehicle comprising a frame, an engine mounted on said frame, a snow blowing device mounted on said frame, a power train drivingly connecting said snow blowing device and said engine, a drive shaft having at each end a portion of reduced diameter, means mounting said drive shaft for rotation on said frame, means drivingly connecting said drive shaft and said engine, a traction wheel carried on each of said reduced diameter drive shaft portions, said traction wheels comprising a pair of rims, transverse means securing said rims to each other in generally opposed parallel relation, means on said rims providing a bearing having an axis about which said rims are intended to rotate, said bearings being engaged with said reduced diameter drive shaft portions, a series of traction blades each including flat projections, means on said rims defining a series of slots respectively receiving said flat projections, each slot having a width substantially greater than the associated one of said flat projections, whereby said blades are loosely secured transversely between said rims and in spaced relation to one another in a circular series around the axis of said drive shaft for translatory movement relative to said rims, said traction blades each extending generally radially and including an outer edge terminating at least as far from the axis of said drive shaft as the adjacent periphery of said rims, and slip clutch means rotatably connecting said traction wheels and said drive shaft.

8. A wheel construction comprising a pair of rims, transverse means securing said rims to each other in generally opposed parallel relation, a series of traction blades each including flat projections, means on said rims defining a series of slots respectively receiving said flat projections, each slot having a width substantially greater than the associated one of said flat projections, whereby said blades are loosely secured transversely between said rims and in spaced relation to one another in a circular series around said axis for translatory movement relative to said rims, said traction blades each extending generally radially and including an outer edge terminating at least as far from said axis as the adjacent periphery of said rims.

9. A wheel in accordance with claim 1 wherein said slots are disposed in spaced relation from the periphery of said rim and wherein each traction blade includes, on each side, a cutout receiving the portion of the associated one of said rims between the associated one of said slots and the rim periphery.

References Cited by the Examiner

UNITED STATES PATENTS

| | | | |
|---|---|---|---|
| 339,391 | 4/1886 | Emans | 172—552 X |
| 408,283 | 8/1889 | Baker | 301—52 |
| 700,109 | 5/1902 | Wilkinson | 172—522 X |
| 1,099,825 | 7/1914 | Schindler | 301—45 |
| 1,109,294 | 9/1914 | Kroger | 301—52 |
| 1,232,730 | 7/1917 | Stewart | 301—45 |
| 1,313,396 | 8/1919 | McCain | 192—49 |
| 1,475,544 | 11/1923 | Davison | 301—43 |
| 1,512,502 | 10/1924 | Schilling | 172—522 X |
| 2,226,759 | 12/1940 | Fitzner | 192—49 |
| 2,554,392 | 5/1951 | Turner | 301—41 |
| 2,679,435 | 5/1954 | Finan | 301—45 |
| 2,714,772 | 8/1955 | Erickson. | |
| 2,854,111 | 9/1958 | Simonson | 192—71 |
| 2,952,146 | 9/1960 | Bruck. | |
| 3,065,555 | 11/1962 | Rubin. | |
| 3,115,714 | 12/1963 | Johnn. | |

FOREIGN PATENTS 10,259    7/1884    Great Britain.

ABRAHAM G. STONE, *Primary Examiner.*

BENJAMIN HERSH, *Examiner.*